(12) United States Patent
Schenk

(10) Patent No.: US 6,563,870 B1
(45) Date of Patent: May 13, 2003

(54) NONLINEAR ECHO COMPENSATOR

(75) Inventor: Heinrich Schenk, München (DE)

(73) Assignee: Infineon Technologies AG, Munich (DE)

( * ) Notice: Subject to any disclaimer, the term of this patent is extended or adjusted under 35 U.S.C. 154(b) by 123 days.

(21) Appl. No.: 09/599,279

(22) Filed: Jun. 22, 2000

Related U.S. Application Data

(63) Continuation of application No. PCT/DE98/03671, filed on Dec. 15, 1998.

(51) Int. Cl.[7] .................................................. H03H 7/40
(52) U.S. Cl. ....................... 375/232; 375/350; 370/290
(58) Field of Search ................................ 375/219, 229, 375/230, 232, 285, 296, 346, 350; 370/286, 290, 291; 379/406.08, 409.09; 455/570; 708/322

(56) References Cited

U.S. PATENT DOCUMENTS

| | | | | |
|---|---|---|---|---|
| 4,464,545 A | | 8/1984 | Werner | 370/286 |
| 4,581,492 A | * | 4/1986 | Virdee | 370/286 |
| 4,669,116 A | * | 5/1987 | Agazzi et al. | 379/406.08 |
| 4,792,915 A | * | 12/1988 | Adams et al. | 708/322 |
| 5,132,963 A | | 7/1992 | Ungerböck | 370/286 |
| 5,146,494 A | | 9/1992 | Harman | 379/406.08 |
| 5,148,427 A | | 9/1992 | Buttle et al. | 370/291 |
| 5,343,522 A | | 8/1994 | Yatrou et al. | 379/406.09 |
| 5,659,609 A | * | 8/1997 | Koizumi et al. | 379/406.11 |
| 5,867,486 A | * | 2/1999 | Sugiyama | 370/290 |
| 6,035,312 A | * | 3/2000 | Hasegawa | 708/322 |

FOREIGN PATENT DOCUMENTS

DE   27 40 123   3/1978

OTHER PUBLICATIONS

"Kombinierte analog/digitale Echolöschung unter Berücksichtigung von Nichtlinearitäten" (Trick et al.), dated 1988, ntz–Archive vol. 10, pp. 59–68, pertains to a combined analog/digital echo compensation . . . , as mentioned on p. 2 of the specification.

"Nonlinear Echo Cancellers Based on Transpose Distributed Arithmetic" (Smith et al.), dated Jan. 1988, IEEE Transactions on Circuits and Systems, vol. 33, No. 1, pp. 6–17.

* cited by examiner

Primary Examiner—Stephen Chin
Assistant Examiner—Chieh M. Fan
(74) Attorney, Agent, or Firm—Laurence A. Greenberg; Werner H. Stemer; Ralph E. Locher

(57) ABSTRACT

A nonlinear echo compensator for an L-level message signal includes a plurality of groups of coefficient memories, wherein each group is assigned to at least one tupel of N successive symbols of the message signal. A selection circuit is connected to a transmit channel in order to receive an outgoing message signal. The selection circuit uses a value, which is currently received, and N−1 preceding symbols of the message signal to select the group associated with the tupel formed by these symbols. A superposition circuit superposes the coefficients of the group, successively and according to a symbol clock, onto a message signal arriving on a receive channel. The echo compensator is particularly suitable for use in a data transmission system in which the symbol pulse duration of the message signal is limited to N*T, where T is the symbol period of the message signal.

44 Claims, 7 Drawing Sheets

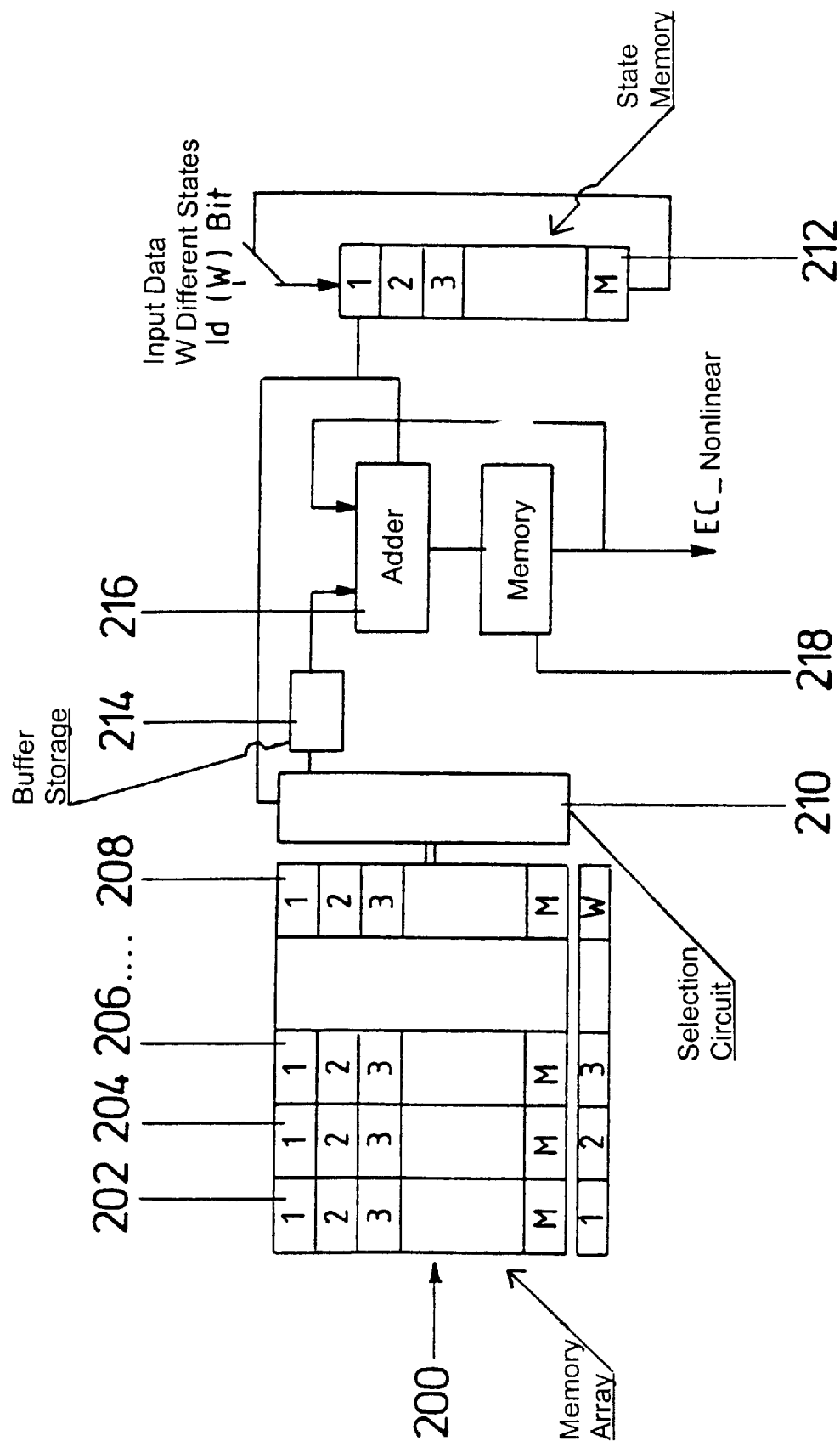

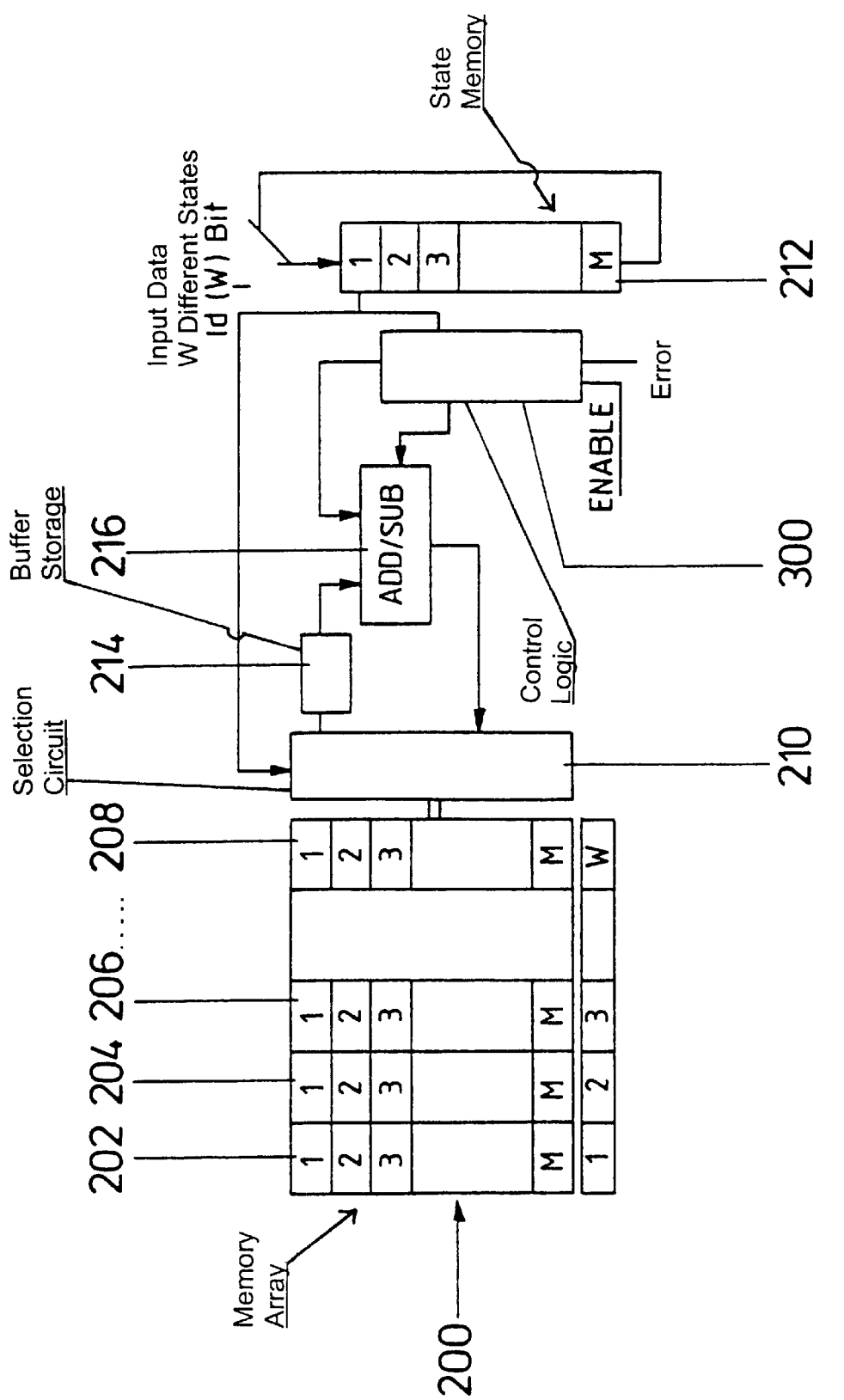

US 6,563,870 B1

NONLINEAR ECHO COMPENSATOR

CROSS-REFERENCE TO RELATED APPLICATION

This application is a continuation of copending International Application No. PCT/DE98/03671, filed Dec. 15, 1998, which designated the United States.

BACKGROUND OF THE INVENTION

Field of the Invention

The invention relates to a nonlinear echo compensator configuration and in particular to an echo compensator configuration to be used in a data transmission system.

Echo compensators are used for a duplex data transmission between two terminals via a line. The echo compensators suppress echoes at the input of a receiver of a terminal. The echoes are caused by the transmitted signal being fed onto the line by the same terminal. This echo suppression is required when the same frequency band is used for transmission in both directions. Transmission systems with echo compensators are disclosed, for example, in U.S. Pat. No. 5,132,963, U.S. Pat. No. 4,464,545 and U.S. Reissue Pat. No. 31 253.

The requirements for such an echo compensator increase as the length of the line increases, and thus as the line attenuation increases since, in this case, the level of the signal received by a terminal decreases, while the level of the echo produced predominantly by this terminal itself remains approximately unchanged. In very long lines, the level of the echo signal is many times greater (30–40 dB) than the received signal level, so that the compensation accuracy is subject to stringent requirements. Depending on the number of levels of the transmitted signal and the overall system noise suppression requirements, it is necessary to achieve a signal-to-noise ratio between the received signal and the residual echo signal of more than 30 dB after compensation.

FIG. 6 is a block diagram of a typical duplex transmission system with two data transmission devices each of which includes a transmitter 2, a receiver 4 and a line interface 6, which is also referred to as a hybrid or four-to-two wire circuit. The function of the line interface 6 is to input data from the transmitter 2 into a transmission line 8, and to pass data arriving via the transmission line on to the receiver 4. Normally, part of the echo is compensated by using an analog matching circuit which is accommodated in the line interface 6. Trick et al., ntz-Archive Volume 10, pages 59–68 (1988) describe a number of variants of such a line interface. Due to the wide variety of lines that may be connected and due to the tolerances of the components used, such matching circuits allow to compensate only part of the echo signal that occurs.

The majority of the echo that occurs is therefore compensated for using a digital system (digital echo compensator), as shown in FIG. 7. FIG. 7 shows the schematic configuration of a data transmission device having a line coder 16, which converts arriving data to the signal format used on the transmission line 8 and outputs the data on a transmission channel 12 via which the data are supplied to both the transmitter 2 and the echo compensator 10. The transmitter 2 includes a pulse former 18 for smoothing the message signal in the time domain and for spectrally limiting the message signal to be transmitted. The pulse former is followed by an amplifier or line driver 20. This amplifier is a major source of nonlinear distortion, whose extent depends on the implementation complexity and the required power loss.

The parameters for the compensator 10 must be set such that the output signal from the echo compensator provides as accurate a match as possible to the residual echo signal on a reception channel 14 to which the output of the echo compensator is connected. Linear echo components, which result from a convolution of the data stream being carried on the transmission channel with an impulse response h(t) of the transmitter, have to be taken into account. Furthermore, nonlinear components are present in the output signal from the transmitter. The nonlinear components result from the sequence of symbols in the data stream and are caused by the fact that the transient behavior or dynamic performance of the transmitter may be different for two different transmitted signal symbols, depending on the combination of these symbols. This results in interference pulses at the receiver input, which decay or fade out over a number of symbol periods T and cannot be suppressed using a linear echo compensator.

In the case of conventional compensator structures to compensate for nonlinear echoes, no distinction is drawn between the source of the nonlinearities (transmitter or receiver). If the echo impulse response decays over M symbol periods, where M>N, that is to say has a duration of M*T, it follows from this that all M symbols transmitted in this time period must be taken into account in the echo compensation. The "storage method" and the "Volterra series method" are normally used for this purpose.

In the storage method, all the echo values that occur in the receiver are stored as a function of the values of the previously transmitted symbols. Although this allows nonlinearities from both the transmitter and the receiver to be corrected, the number of memory or storage locations required to do so rises exponentially with the length of the impulse response, and is $S=L^M$ for an L-level transmitted signal.

In the Volterra series method, the echo signal is first of all developed to form a Volterra series in which the contributions of all the combinations of transmitted symbols are taken into account up to a length M of the combination to form the echo signal. Once again, memory space is required, in the general case, for $S=L^M$ different combinations. Although, depending on the extent of the nonlinearity, the series may be terminated prematurely, thus reducing the number of coefficients to be considered, the complexity is still considerable for increasing echo impulse response lengths and multi-level transmission.

U.S. Pat. No. 5,146,494 discloses a nonlinear echo compensator which has a number of coefficient memories, to each of which one symbol from the message signal is assigned, and which are addressed using this symbol. Furthermore, a superposition device is provided, through the use of which the coefficients read from the memories are superposed on a received signal.

U.S. Pat. No. 5,148,427 discloses an echo compensator which is formed from a linear echo compensator and a nonlinear echo compensator. The linear echo compensator has a digital transversal filter.

SUMMARY OF THE INVENTION

It is accordingly an object of the invention to provide a compensator structure which overcomes the above-mentioned disadvantages of the heretofore-known compensator structures of this general type and whose memory complexity is considerably reduced. The compensator structure according to the invention is particularly suitable for compensating nonlinearities that arise in the transmitter.

With the foregoing and other objects in view there is provided, in accordance with the invention, an echo compensator configuration, including a nonlinear echo compensator having:

- a plurality of groups of coefficient memories, each of the groups of coefficient memories storing respective coefficients and being assigned to at least one tupel of N successive symbols of a message signal having L levels, N and L being integer numbers;
- a selection circuit connected to the plurality of groups of coefficient memories and to be connected to a transmit channel for receiving an outgoing message signal including symbols, the selection circuit using a currently received one of the symbols of the outgoing message signal and N−1 preceding ones of the symbols of the outgoing message signal for selecting one of the groups of coefficient memories assigned to a tupel formed by the currently received one of the symbols and the N−1 preceding ones of the symbols; and
- a superposition circuit to be connected to a receive channel and connected to the selection circuit for superposing, successively and according to a symbol clock, the respective coefficients of the selected one of the groups of coefficient memories on a message signal arriving on the receive channel.

With the objects of the invention in view there is also provided, in a data transmission system including a transmitter receiving data to be transmitted on a transmit channel, the transmitter passing the data to a transmission line and limiting a transmission pulse duration of a message signal to N*T, where N is an integer number and T is a symbol period of the message signal, a nonlinear echo compensator, including:

- a plurality of groups of coefficient memories, each of the groups of coefficient memories storing respective coefficients and being assigned to at least one tupel of N successive symbols of the message signal having L levels, L being an integer number;
- a selection circuit connected to the plurality of groups of coefficient memories and to be connected to the transmit channel for receiving an outgoing message signal including symbols, the selection circuit using a currently received one of the symbols of the outgoing message and N−1 preceding ones of the symbols of the outgoing message signal for selecting one of the groups of coefficient memories assigned to a tupel formed by the currently received one of the symbols and the N−1 preceding ones of the symbols; and
- a superposition circuit to be connected to a receive channel and connected to the selection circuit for superposing, successively and according to a symbol clock, the respective coefficients of the selected one of the groups of coefficient memories on a message signal arriving on the receive channel.

In other words, the object of the invention is achieved by a nonlinear echo compensator for an L-level message signal, which has a plurality of groups of coefficient memories, wherein each group is assigned to at least one tupel of N successive symbols of the message signal, a selection circuit which is connected to a transmit channel in order to receive an outgoing message signal, and which is able to use a value currently being received and N−1 preceding symbols of the message signal to select the group associated with the tupel formed by these symbols, and a superposition circuit, which is able to superpose the coefficients of the group, successively and according to a symbol clock, on a message signal arriving on a receive channel or reception channel.

Digital transversal filters are preferably used as the filter elements.

In this case, each group of coefficients may form a filter element in the form of a digital transversal filter.

The selection circuit is expediently able to use the value currently being received and the N−1 preceding symbols of the message signal to excite the filter element associated with the tupel formed by these symbols, and the superposition circuit is set up in order to superpose the response signals from the filter elements on the arriving message signal. This measure ensures that, in each symbol period, the arriving message signal has superimposed thereon the first coefficient of a currently excited filter element, if required the second coefficient of a filter element excited in the previous symbol period, and generally the n-th coefficient of a symbol period that occurred n−1 symbol periods before, thus producing an accurate model of the nonlinearities caused successively in the transmitter.

Alternatively, each group of coefficients may form a column of a memory matrix which is organized in rows and columns, wherein the selection circuit is able to select the first coefficient of the group associated with the tupel in one symbol period and respectively to select subsequent coefficients in the group in subsequent symbol periods, and the superposition circuit superposes the sum of the selected coefficients on the arriving message signal, in order in this way to produce an accurate model of the nonlinearities which are caused successively in the transmitter.

In accordance with another feature of the invention, the selection circuit includes a number of memory cells for storing tupels. The number of the memory cells corresponds to a number of the rows in the memory matrix, and the selection circuit replaces, during each of the symbol periods, an oldest one of the tupels stored in the memory cells with a current one of the tupels.

In accordance with a further feature of the invention, each of the groups of coefficient memories is assigned to at least one tupel of two successive symbols of the message signal.

In accordance with yet another feature of the invention, each of the groups of coefficient memories is assigned to at least one tupel of N successive symbols of a message signal having two levels.

The number of coefficients in each group is expediently chosen to correspond to the duration of the echo signal component caused by the associated tupels. In this case, the number of coefficients may be matched to the length of the respective echo signal component based on the duration of the longest echo signal component, jointly for all the groups, or individually.

In accordance with another feature of the invention, the groups of coefficient memories are assigned only to tupels of successive symbols causing an echo signal component exceeding a given minimum value.

In accordance with yet another feature of the invention, the groups of coefficient memories store adjustable coefficients.

The nonlinear echo compensator according to the invention can advantageously be used combined with a linear echo compensator. Since the linear component in the echo signal predominates, the linear compensator can carry out a coarse compensation so that the amplitudes of the responses to be produced by the individual groups are reduced, and their number of coefficients can be kept lower.

In accordance with another feature of the invention, a linear echo compensator is to be connected to the transmit channel. The linear echo compensator is a digital transversal filter and provides an output signal. A further superposition circuit is connected to the linear echo compensator for superposing the output signal from the linear echo compensator onto the message signal arriving on the receive channel.

In accordance with yet another feature of the invention, the superposition circuit and the further superposition circuit are configured as an addition element.

In accordance with a further feature of the invention, a linear echo compensator is to be connected to the transmit channel. The linear echo compensator is a digital transversal filter. The linear echo compensator and the nonlinear echo compensator provide respective output signals. A fixed recursive filter is connected in series with the linear echo compensator.

In accordance with yet a further feature of the invention, a linear echo compensator is to be connected to the transmit channel. The linear echo compensator is a digital transversal filter, and the linear echo compensator and the nonlinear echo compensator provide respective output signals. An addition circuit has an output connected to an input of the fixed recursive filter for adding the respective output signals from the nonlinear echo compensator and from the linear echo compensator.

In accordance with another feature of the invention, the fixed recursive filter has a transfer function $f=1/(1-(1-2^n)z^{-1})$ where n is an integer number and z is a complex value.

The echo compensator can advantageously be used in a data transmission system having a transmitter which receives data to be transmitted on the transmission channel and passes such data to a transmission line, wherein the transmission pulse duration of the message signal is limited in the transmitter to $N*T$, where T is the symbol period of the message signal. This transmission pulse duration limit implies that the signal emitted from the transmitter is defined at any time by a maximum of N symbols, with these N symbols also defining the nonlinearities in the output from the transmitter.

Other features which are considered as characteristic for the invention are set forth in the appended claims.

Although the invention is illustrated and described herein as embodied in a nonlinear echo compensator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is block diagram of a further embodiment of the nonlinear echo compensator according to the invention;

FIG. 3 is a block diagram illustrating a circuit configuration for setting the coefficients in the nonlinear echo compensator shown in FIG. 2;

DESCRIPTION OF THE PREFERRED EMBODIMENTS

The following description relates to a message signal having L=4 levels -3, -1, 1, 3 (2B1Q coding). A person skilled in the art will however be able to generalize the description for signals having other levels without any difficulties.

Figure 7:
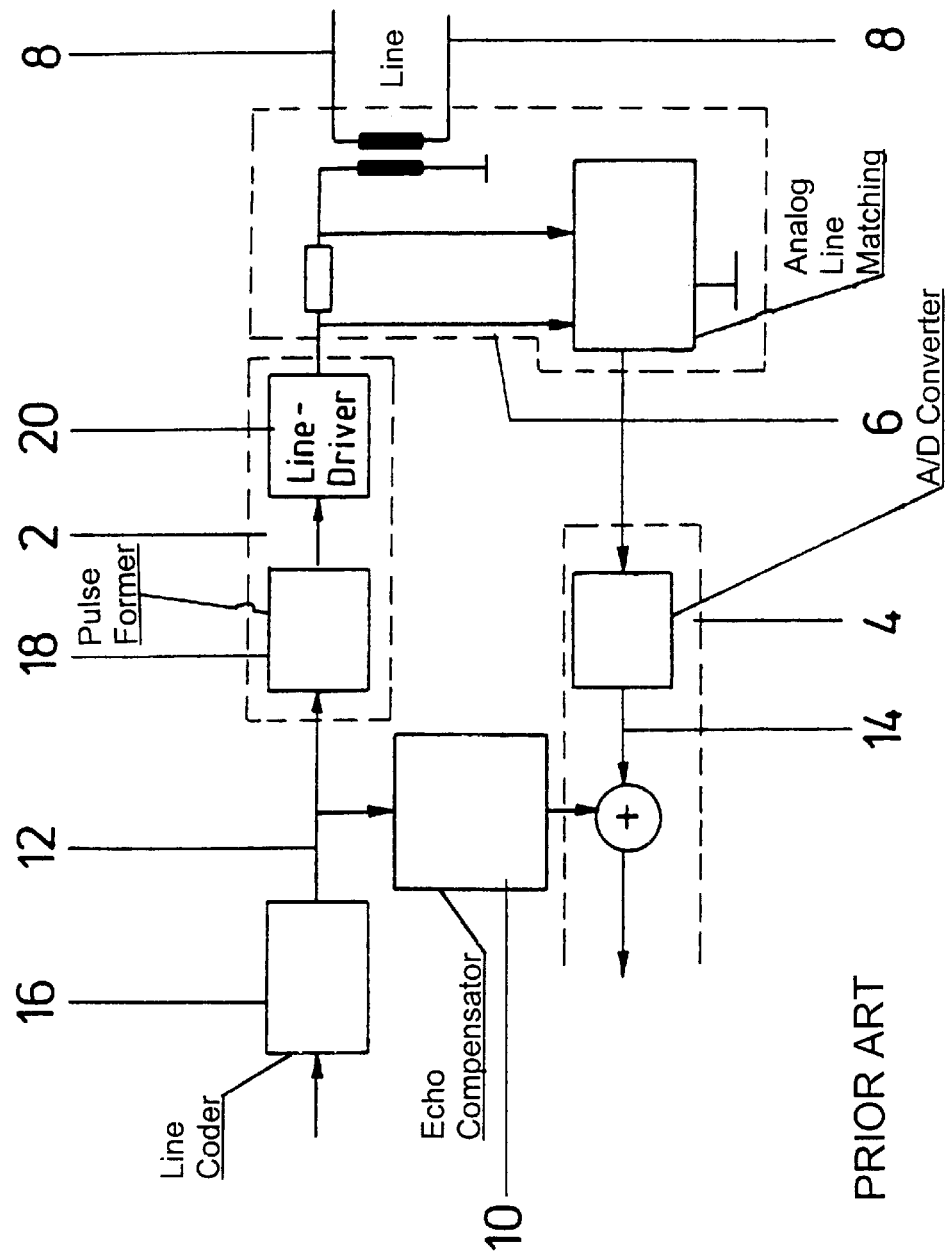
FIG. 7 is a block diagram of a transmission device having an echo compensator.
Figure 9:
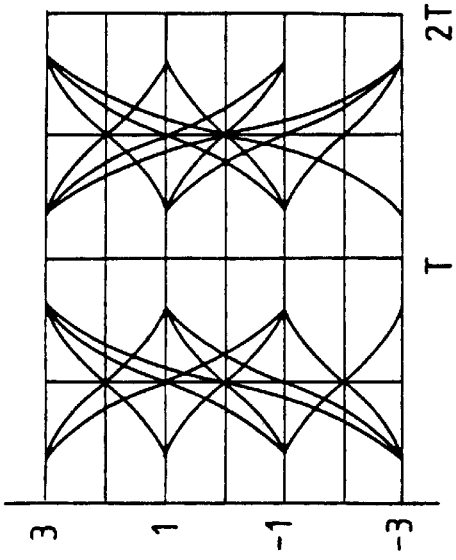
FIG. 9 is a graph illustrating an eye pattern at the output of the line driver.
Figure 8:
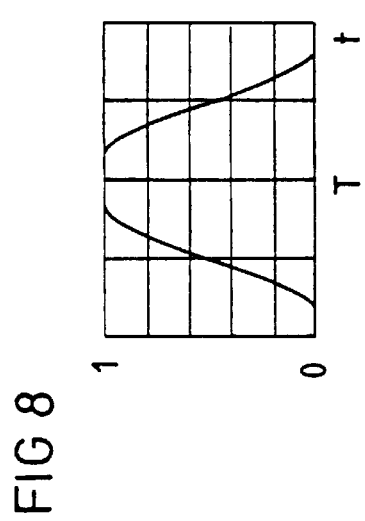
FIG. 8 is a graph illustrating an idealized transmission pulse.

Referring now to the figures of the drawings in detail and first, particularly, to FIG. 8 thereof, there is shown an idealized transmission pulse, as can be produced by the pulse former 18 of the transmission device as shown in FIG. 7. The duration of the transmission pulse is limited to a maximum of 2T, where T is the symbol duration of the transmission device. FIG. 9 shows the eye pattern of a four-level message signal with pulses, which are time-limited in this way. It can be seen from the eye pattern that the signal level that is present at the line driver 20 at any time depends on a maximum of two symbols. The output signal from the line driver, when individual pulses are limited to $2*T$, can be composed, in a corresponding manner, of a linear element and a nonlinear element. The linear element is obtained by convolution of the four-level data stream to be transmitted with the impulse response of the transmitter h(t). The nonlinear element is composed of time-shifted distortion pulses, which correspond to the transitions between two symbols in the transmitted signal. A total of 16 possible different distortion impulse responses exist for a four-level transmission system and a pulse duration of $2*T$, corresponding to the 16 possible data transitions.

Figure 10:
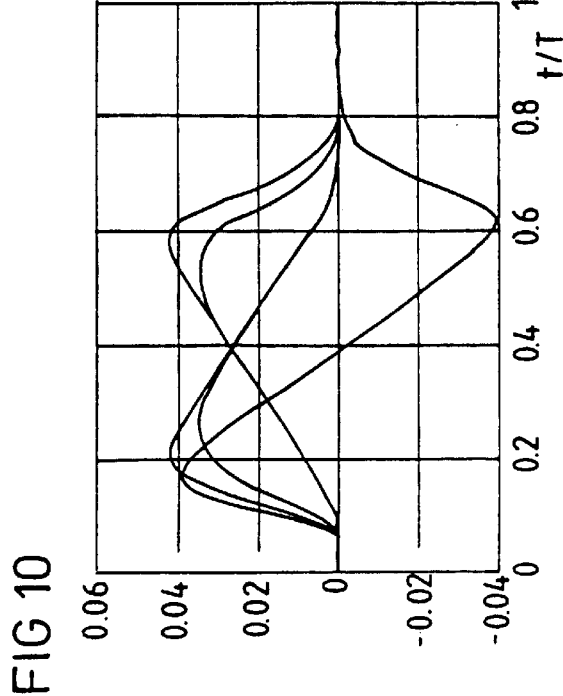
FIG. 10 is a graph illustrating nonlinear interference pulses at the output of the transmitter.

The nonlinear distortion pulses will be explained in more detail with reference to a practical example. In order to simplify the explanation, a steady-state output waveform with saturation characteristic will be used as the nonlinear distortion of the line driver. Taking account of the given level limits or the given dynamic range limits and with a sinusoidal drive, this results in a third harmonic element or harmonic wave of -45 dB and a fifth harmonic element of -50 dB, both with respect to the fundamental wave. The nonlinear distortion pulses shown in FIG. 10 were measured at the output of the line driver. Shown are a total of 5 pulses, corresponding to transitions of +3 to +1, from +1 to +3 and from +3 to -3. Another five distortion pulses result from mathematical sign reversal, four distortion pulses (+3 to +3, +1 to +1, -1 to -1 and -3 to -3) do not exist, and the remaining two (+1 to -1, -1 to +1) are negligible.

Figure 11:
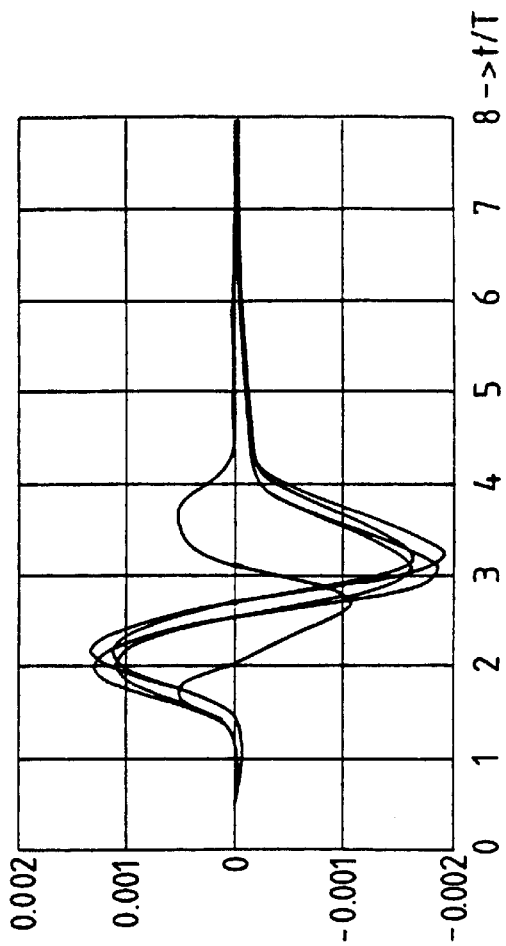
FIG. 11 is a graph illustrating nonlinear interference pulses at the input of the receiver.

The actual transmitted signal is thus obtained by superimposing these interference pulses on the linear output signal. Due to the dispersive properties of the echo path, this results in interference pulses at the receiver input which decay or fade out only after a number of symbol periods. FIG. 11 shows these interference pulses. A linear echo compensator cannot compensate for these interference pulses.

If the duration of the transmitted pulse is generally limited to N*T, then it can be seen that, in this case, the input level of the amplifier 20 is governed by the N most recent symbols, and that the nonlinear interference pulses cannot be defined just by the two most recently transmitted symbols, since they must depend on the total of N most recent symbols. In a case such as this, a total of $L^N$ different interference pulses have to be taken into account.

Figure 1:
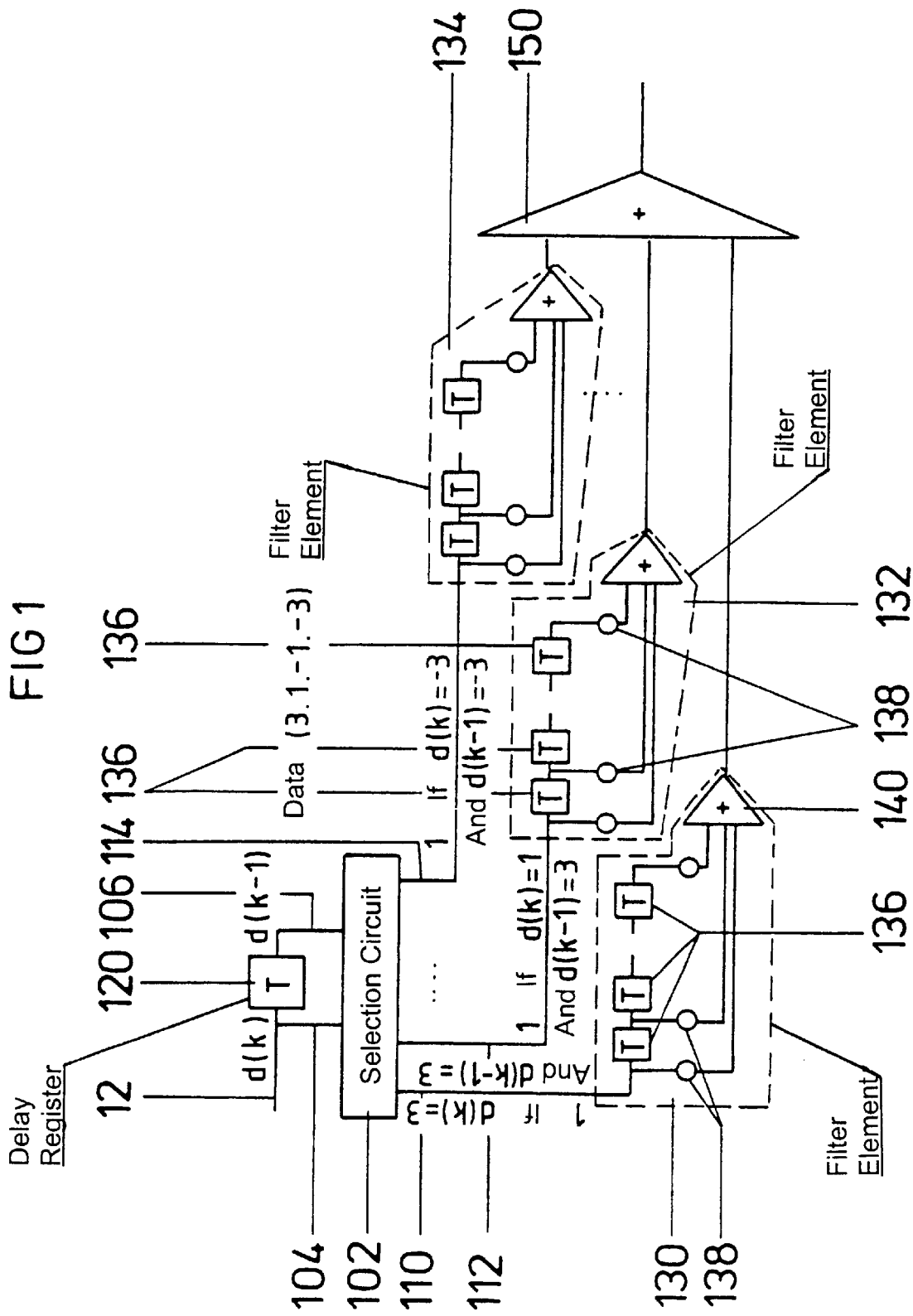
FIG. 1 is a block diagram of the nonlinear echo compensator according to the invention.

The configuration of the nonlinear echo compensator shown schematically in FIG. 1 is based on this analysis, and this nonlinear echo compensator can be used as an echo compensator 10 for the transmission device shown in FIG. 7. This nonlinear echo compensator includes a selection circuit 102 in the form of a demultiplexer having two inputs 104, 106 and $L^2$ outputs, only three of which, 110, 112, 114, are shown. The echo compensator is configured for a message signal limited to a pulse duration of 2T. The first input 104 is connected directly to a transmission channel, and the second input 106 is connected via a delay register 120, which in each case delays the transmitted signal by one symbol period T. The symbol d(k) currently being transmitted on the transmission channel and the symbol d(k−1) transmitted one symbol period previously are thus always present at the inputs of the selection circuit 102.

One output 110, 112, 114 is assigned to each combination of symbols (d(k), d(k−1)). When the associated combination is present at the selection circuit 102, an excitation signal, for example logic 1, is emitted at the output. Thus, for example, the output 110 is at logic 1 when d(k)=3 and d(k−1)=3, otherwise it is 0.

A digital transversal filter 130, 132, 134 is connected to each of the outputs 110, 112, 114. Each of these filter elements contains, in a manner known per se, a chain of delay registers 136, multipliers 138, connected to the input and output of the delay register chain and between the delay registers, for multiplication by a stored, adjustable coefficient, and an adder 140 for adding the output signals from the multipliers. An output adder 150 adds the output signals, and thus forms a compensation signal.

One of the partial filters or filter elements 130, 132, 134 is excited in each symbol period and then, during a number of periods corresponding to the number of its delay registers 136, reproduces a characteristic sequence of compensation values, which models the nonlinear distortion caused by the corresponding symbol pair in the transmitter. After a specific number of periods, this distortion decays or fades below a limit value, below which a compensation is no longer necessary. The length of the delay register chain is chosen to correspond to this number of periods.

There are symbols pairs which cause identical nonlinear distortions, and one partial filter or filter element can be assigned jointly to such symbol pairs.

Symbol pairs which do not cause any significant nonlinearities need not be assigned any filter elements.

A nonlinear echo compensator based on the configuration principle shown in FIG. 1, for a message signal which is generally limited to a duration of N*T, has a selection circuit 102 with N inputs and N−1 delay registers 120, which form a chain, in order to apply the N most recent symbols to the inputs of the selection circuit 102. The number of filter elements or partial filters is $W=L^N$ corresponding to the number of nonlinear interference pulses that need to be taken into account. The following table shows the maximum number of filter elements required for transmitted pulse lengths of 2T and 3T, and various levels.

TABLE I

| L | W for N = 2 | W for N = 3 |
|---|---|---|
| 2 | 4 | 8 |
| 3 | 9 | 27 |
| 4 | 16 | 64 |
| 8 | 64 | 512 |

The number of filter elements actually required may be less than the number given in Table I, depending on the nonlinearities which actually occur in the transmitter.

It can be seen from the table that, particularly for short transmitted pulses (N=2) and line codes with a small number of levels (e.g. L=4), the compensator structure described above represents a good option for providing compensation for nonlinear echo signals.

FIG. 2 shows a second embodiment of the nonlinear echo compensator according to the invention. This nonlinear echo compensator includes a memory array 200 organized in columns and rows like a matrix and having W columns 202, 204, 206, 208, each containing M coefficients, a selection circuit in the form of address logic 210 for reading and writing the coefficients, a state memory 212 for storing the M most recent states of the echo compensator, a buffer storage 214, an adder 216 and a memory 218.

An echo compensator state is defined as the combination of the N most recent transmitted symbols. If d(k) denotes the symbol currently being transmitted on the transmission channel, then the most recent state stored in cell 1 of the state memory 212 includes the symbols d(k), d(k−1), . . . , d(k−N), the state stored in the cell 2 includes the symbols d(k−1), d(k−2), . . . d(k−N−1), etc. The respective oldest stored state is replaced by the current state in each symbol period. Each state identifies the filter element excited in the corresponding symbol period.

At the start of each symbol period, the contents of the memory 218 are set to 0 and the M stored states are then read successively by the address logic 210, with the j-th state (j=1, . . . , M) being used to address the j-th cell in the column of the memory array 200 associated with this state. This column, together with the coefficients stored in it, forms the filter element associated with this state.

The addressed coefficient is transferred to the buffer storage 214 and is added, by the adder 216, to a value which the memory 218 already contains. Once the coefficients for all M states have been read and added, the memory 218 contains the compensation value required for the relevant symbol period.

The circuit configuration for coefficient setting shown in FIG. 3 contains largely the same components as the nonlinear echo compensator shown in FIG. 2. These components have the same reference symbols, and will not be described once again. The control logic or setting logic 300 receives an error signal, which indicates the difference between the compensation signal and the actual echo on the reception channel. The adder 216 adds this difference signal to, or subtracts it from, a coefficient, which is read using the address logic 210 and is loaded in the buffer storage 214, and the result is written back to the memory cell of the coefficient.

Figure 4C:
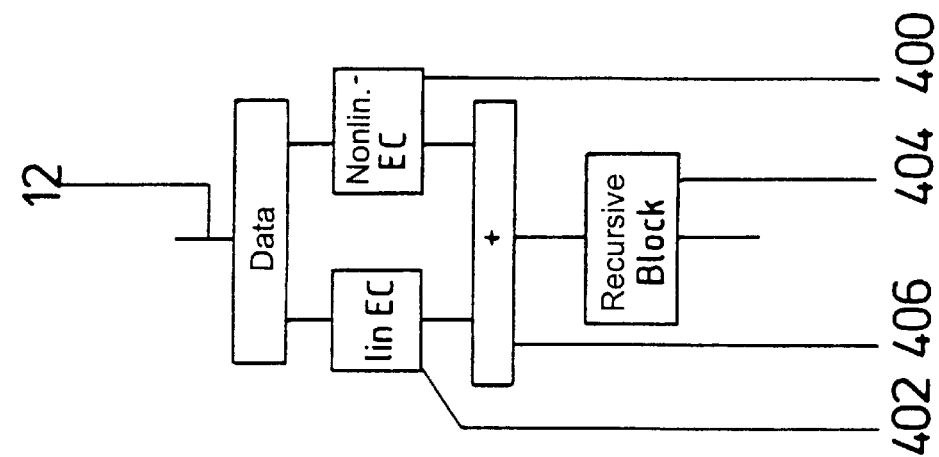
FIG. 4C is a block diagram of a compensator configuration having a linear echo compensator, a nonlinear echo compensator and a fixed recursive filter.
Figure 4B:
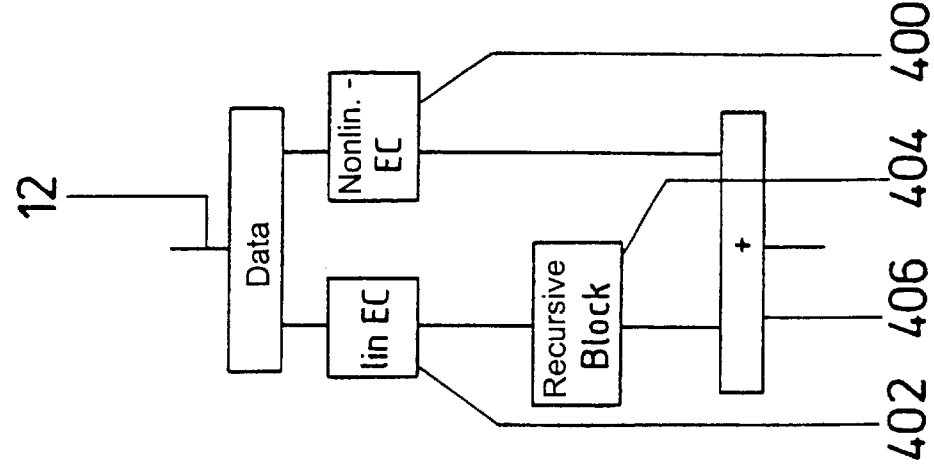
FIG. 4B is a block diagram of a compensator configuration having a linear echo compensator, a nonlinear echo compensator and a fixed recursive filter.
Figure 4A:
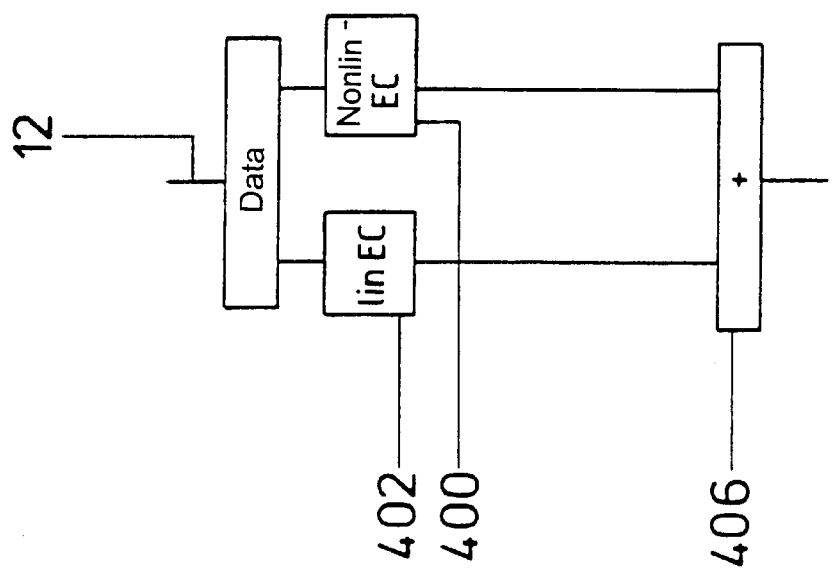
FIG. 4A is a block diagram of a compensator configuration having a linear and a nonlinear echo compensator.
Figure 5:
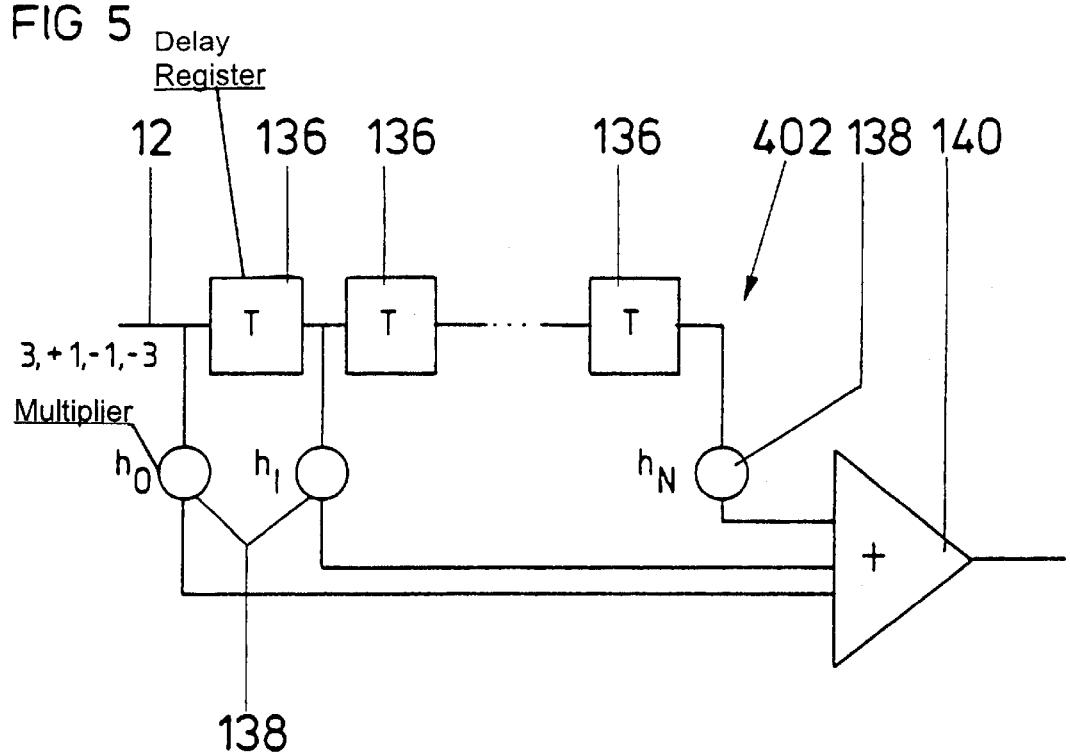
FIG. 5 is a block diagram of a linear echo compensator.
Figure 6:
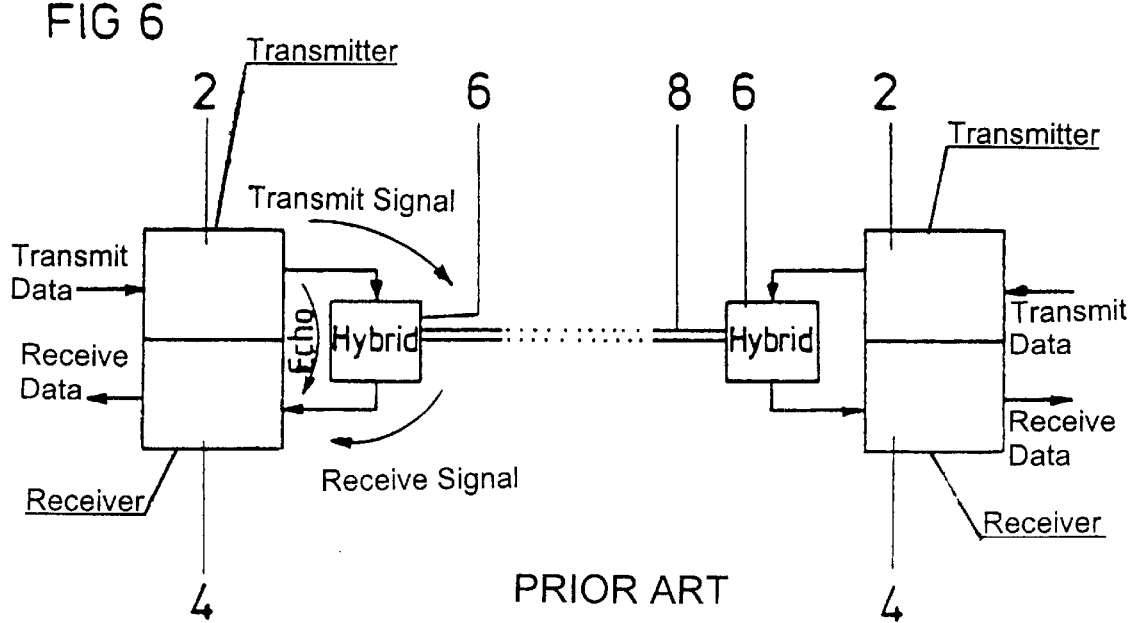
FIG. 6 is a block diagram of a conventional transmission system.

In addition to the nonlinear echo compensator described above, the overall echo compensator 10 (FIG. 7) expediently also includes a linear echo compensator 402, which, as shown in FIG. 4A, receives, in parallel with the nonlinear echo compensator 400, data from the transmission channel 12, and suppresses the linear echo component of the data. Although linear echo components may also be compensated for solely by the nonlinear echo compensator, it is, however, advantageous to provide the linear compensator 402, not only with regard to the width (number of bits) of the coefficients to be processed in the nonlinear echo compensator but also with regard to the number of the components, since the amplitude and duration of the linear echo components are generally greater than those of the nonlinear echo components. FIG. 5 shows the configuration of the linear compensator. The configuration is identical to that of the filter elements 130, 132, 134 shown in FIG. 1, and therefore does not need to be described in detail again. Due to the greater amplitude and duration of the linear interference, the bit width and the length (number of coefficients) of the linear compensator may be greater than those of the filter elements or partial filters.

In addition, the required length of the echo compensator, that is to say the number of coefficients, can be reduced further by using a fixed digital filter, for example a recursive $1^{st}$-order filter 404 with a transfer function $$H(z)=1/[1-(1-2^{-n})*z^{-1}],$$

as shown in FIGS. 4B and C. This filter 404 may be connected in series with the linear compensator 402 on its own (FIG. 4B), or it may be connected downstream from an adder 406, as is shown in FIG. 4C, so that it acts on the compensation signals of both the linear and the nonlinear compensator. The latter configuration represents an advantageous solution, in particular, for transmission systems using two-wire copper lines, allowing the number of coefficients in both the linear and the nonlinear compensator to be reduced. A filter with the transfer function $H(z)=1/[1-0.875*z^{-1}]$ has been found to be highly suitable for such an application.

I claim:

1. An echo compensator configuration, comprising:
    a nonlinear echo compensator including:
        a plurality of groups of coefficient memories, each of said groups of coefficient memories storing respective groups of coefficients and being assigned to at least one tupel of N successive symbols of a message signal having L levels, N and L being integer numbers, each of the groups of coefficients forming a column in a memory matrix organized in rows and columns;
        a selection circuit connected to said plurality of groups of coefficient memories and to be connected to a transmit channel for receiving an outgoing message signal including symbols, said selection circuit using a currently received one of the symbols of the outgoing message signal and N−1 preceding ones of the symbols of the outgoing message signal for selecting one of said groups of coefficient memories assigned to a tupel formed by the currently received one of the symbols and the N−1 preceding ones of the symbols, the selection circuit selecting, during a first symbol period, a first one of the coefficients in one of the groups of coefficients assigned to a given tupel and selecting, during subsequent symbol periods, subsequent ones of the coefficients in the one of the groups of coefficients; and
        a superposition circuit to be connected to a receive channel and connected to said selection circuit for superposing, successively and according to a symbol clock, the respective coefficients of the selected one of said groups of coefficient memories on a message signal arriving on the receive channel, said superposition circuit superposing a sum of the selected first one and the selected subsequent ones of said coefficients on the message signal arriving on the receive channel.

2. The echo compensator configuration according to claim 1, wherein said groups of coefficient memories form filter elements, and said filter elements are digital transversal filters.

3. The echo compensator configuration according to claim 2, wherein said selection circuit excites one of said filter elements based on the currently received one of the symbols of the outgoing message signal and the N−1 preceding ones of the symbols of the outgoing message signal, said one of said filter elements is assigned to the tupel formed by the currently received one of the symbols and the N−1 preceding ones of the symbols, and the superposition circuit superposes response signals from said filter elements on the message signal arriving on the receive channel.

4. The echo compensator configuration according to claim 1, wherein said selection circuit includes a number of memory cells for storing tupels, the number of the memory cells corresponds to a number of the rows in the memory matrix, and said selection circuit replaces, during each of the symbol periods, an oldest one of the tupels stored in said memory cells with a current one of the tupels.

5. The echo compensator configuration according to claim 1, wherein each of said groups of coefficient memories is assigned to at least one tupel of two successive symbols of the message signal.

6. The echo compensator configuration according to claim 1, wherein each of said groups of coefficient memories is assigned to at least one tupel of three successive symbols of the message signal.

7. The echo compensator configuration according to claim 1, wherein each of said groups of coefficient memories is assigned to at least one tupel of N successive symbols of a message signal having two levels.

8. The echo compensator configuration according to claim 1, wherein each of said groups of coefficient memories is assigned to at least one tupel of N successive symbols of a message signal having three levels.

9. The echo compensator configuration according to claim 1, wherein each of said groups of coefficient memories is assigned to at least one tupel of N successive symbols of a message signal having four levels.

10. The echo compensator configuration according to claim 1, wherein each of said groups of coefficient memories is assigned to at least one tupel of N successive symbols of a message signal having eight levels.

11. The echo compensator configuration according to claim 1, wherein each of said groups of coefficient memories stores a given number of the respective coefficients, the given number is selected to correspond to a duration of an echo signal component caused by the tupel of the successive symbols.

12. The echo compensator configuration according to claim 1, wherein said groups of coefficient memories are assigned only to tupels of successive symbols causing an echo signal component exceeding a given minimum value.

13. The echo compensator configuration according to claim 1, wherein said groups of coefficient memories store adjustable coefficients.

14. The echo compensator configuration according to claim 1, including:
    a linear echo compensator to be connected to the transmit channel, said linear echo compensator being a digital transversal filter and providing an output signal; and a further superposition circuit connected to said linear echo compensator for superposing the output signal from said linear echo compensator on the message signal arriving on the receive channel.

15. The echo compensator configuration according to claim 14, wherein said superposition circuit and said further superposition circuit are configured as an addition element.

16. The echo compensator configuration according to claim 1, including:

a linear echo compensator to be connected to the transmit channel, said linear echo compensator being a digital transversal filter, said linear echo compensator and said nonlinear echo compensator providing respective output signals; and a fixed recursive filter connected in series with said linear echo compensator.

17. The echo compensator configuration according to claim 16, including a further superposition circuit connected to said fixed recursive filter.

18. The echo compensator configuration according to claim 17, wherein said superposition circuit and said further superposition circuit are configured as an addition element.

19. The echo compensator configuration according to claim 1, including:

a linear echo compensator to be connected to the transmit channel, said linear echo compensator being a digital transversal filter, said linear echo compensator and said nonlinear echo compensator providing respective output signals;

a fixed recursive filter having an input; and an addition circuit having an output connected to said input of said fixed recursive filter for adding the respective output signals from said nonlinear echo compensator and from said linear echo compensator.

20. The echo compensator configuration according to claim 19, wherein said superposition circuit is configured as an addition element.

21. The echo compensator configuration according to claim 16, wherein said fixed recursive filter has a transfer function $f=1/(1-(1-2^n)z^{-1})$ where n is an integer number and z is a complex value.

22. The echo compensator configuration according to claim 19, wherein said fixed recursive filter has a transfer function $f=1/(1-(1-2^n)z^{-1})$ where n is an integer number and z is a complex value.

23. In a data transmission system including a transmitter receiving data to be transmitted on a transmit channel, the transmitter passing the data to a transmission line and limiting a transmission pulse duration of a message signal to N*T, where N is an integer number and T is a symbol period of the message signal, and a nonlinear echo compensator, the nonlinear echo compensator comprising:

a plurality of groups of coefficient memories, each of said groups of coefficient memories storing respective groups of coefficients and being assigned to at least one tupel of N successive symbols of a message signal having L levels, N and L being integer numbers, each of the groups of coefficients forming a column in a memory matrix organized in rows and columns;

a selection circuit connected to said plurality of groups of coefficient memories and to be connected to the transmit channel for receiving an outgoing message signal including symbols, said selection circuit using a currently received one of the symbols of the outgoing message signal and N-1 preceding ones of the symbols of the outgoing message signal for selecting one of said groups of coefficient memories assigned to a tupel formed by the currently received one of the symbols and the N-1 preceding ones of the symbols, said selection circuit selecting, during a first symbol period, a first one of the coefficients in one of the groups of coefficients assigned to a given tupel and selecting, during subsequent symbol periods, subsequent ones of the coefficients in the one of the groups of coefficients; and a superposition circuit to be connected to a receive channel and connected to said selection circuit for superposing, successively and according to a symbol clock, the respective coefficients of the selected one of said groups of coefficient memories on a message signal arriving on the receive channel, said superposition circuit superposing a sum of the selected first one and the selected subsequent ones of the coefficients on the message signal arriving on the receive channel.

24. An echo compensator configuration, comprising:

a nonlinear echo compensator including:

a plurality of groups of coefficient memories, each of said groups of coefficient memories storing respective groups of coefficients and being assigned to at least one tupel of N successive symbols of a message signal having L levels, N and L being integer numbers, the groups of coefficient memories being assigned only to tupels of successive symbols causing an echo signal component exceeding a given minimum value;

a selection circuit connected to the plurality of groups of coefficient memories and to be connected to a transmit channel for receiving an outgoing message signal including symbols, said selection circuit using a currently received one of the symbols of the outgoing message signal and N-1 preceding ones of the symbols of the outgoing message signal for selecting one of the groups of coefficient memories assigned to a tupel formed by the currently received one of the symbols and the N-1 preceding ones of the symbols; and a superposition circuit to be connected to a receive channel and connected to said selection circuit for superposing, successively and according to a symbol clock, the respective coefficients of the selected one of the groups of coefficient memories on a message signal arriving on the receive channel.

25. The echo compensator configuration according to claim 24, wherein the groups of coefficient memories store adjustable coefficients.

26. The echo compensator configuration according to claim 24, including:

a linear echo compensator to be connected to the transmit channel, said linear echo compensator being a digital transversal filter and providing an output signal; and a further superposition circuit connected to said linear echo compensator for superposing the output signal from said linear echo compensator on the message signal arriving on the receive channel.

27. The echo compensator configuration according to claim 26, wherein said superposition circuit and said further superposition circuit are configured as an addition element.

28. The echo compensator configuration according to claim 24, including:

a linear echo compensator to be connected to the transmit channel, said linear echo compensator being a digital transversal filter, said linear echo compensator and said nonlinear echo compensator providing respective output signals; and a fixed recursive filter connected in series with said linear echo compensator.

29. The echo compensator configuration according to claim 28, including a further superposition circuit connected to said fixed recursive filter.

30. The echo compensator configuration according to claim 29, wherein said superposition circuit and said further superposition circuit are configured as an addition element.

31. The echo compensator configuration according to claim 24, including:

a linear echo compensator to be connected to the transmit channel, said linear echo compensator being a digital transversal filter, said linear echo compensator and said nonlinear echo compensator providing respective output signals;

a fixed recursive filter having an input; and an addition circuit having an output connected to said input of said fixed recursive filter for adding the respective output signals from said nonlinear echo compensator and from said linear echo compensator.

32. The echo compensator configuration according to claim 31, wherein said superposition circuit is configured as an addition element.

33. The echo compensator configuration according to claim 28, wherein said fixed recursive filter has a transfer function $f=1/(1-(1-2^n)z^{-1})$ where n is an integer number and z is a complex value.

34. The echo compensator configuration according to claim 31, wherein said fixed recursive filter has a transfer function $f=1/(1-(1-2^n)z^{-1})$ where n is an integer number and z is a complex value.

35. In a data transmission system including a transmitter receiving data to be transmitted on a transmit channel, the transmitter passing the data to a transmission line and limiting a transmission pulse duration of a message signal to $N*T$, where N is an integer number and T is a symbol period of the message signal, and a nonlinear echo compensator, the nonlinear echo compensator comprising:

a plurality of groups of coefficient memories, each of said groups of coefficient memories storing respective groups of coefficients and being assigned to at least one tupel of N successive symbols of a message signal having L levels, N and L being integer numbers, the groups of coefficient memories being assigned only to tupels of successive symbols causing an echo signal component exceeding a given minimum value;

a selection circuit connected to said plurality of groups of coefficient memories and to be connected to the transmit channel for receiving an outgoing message signal including symbols, said selection circuit using a currently received one of the symbols of the outgoing message signal and N–1 preceding ones of the symbols of the outgoing message signal for selecting one of said groups of coefficient memories assigned to a tupel formed by the currently received one of the symbols and the N–1 preceding ones of the symbols; and a superposition circuit to be connected to a receive channel and connected to said selection circuit for superposing, successively and according to a symbol clock, the respective coefficients of the selected one of said groups of coefficient memories on a message signal arriving on the receive channel.

36. An echo compensator configuration, comprising:

a nonlinear echo compensator including:

a plurality of groups of coefficient memories, each of said groups of coefficient memories storing respective groups of coefficients and being assigned to at least one tupel of N successive symbols of a message signal having L levels, N and L being integer numbers;

a selection circuit connected to said plurality of groups of coefficient memories and to be connected to a transmit channel for receiving an outgoing message signal including symbols, said selection circuit using a currently received one of the symbols of the outgoing message signal and N–1 preceding ones of the symbols of the outgoing message signal for selecting one of said groups of coefficient memories assigned to a tupel formed by the currently received one of the symbols and the N–1 preceding ones of the symbols;

a superposition circuit to be connected to a receive channel and connected to said selection circuit for superposing, successively and according to a symbol clock, the respective coefficients of the selected one of said groups of coefficient memories on a message signal arriving on the receive channel;

a linear echo compensator to be connected to the transmit channel, said linear echo compensator being a digital transversal filter, said linear echo compensator and said nonlinear echo compensator providing respective output signals; and a fixed recursive filter connected in series with said linear echo compensator.

37. The echo compensator configuration according to claim 36, including a further superposition circuit connected to said fixed recursive filter.

38. The echo compensator configuration according to claim 37, wherein said superposition circuit and said further superposition circuit are configured as an addition element.

39. The echo compensator configuration according to claim 36, wherein said fixed recursive filter has a transfer function $f=1/(1-(1-2^n)z^{-1})$ where n is an integer number and z is a complex value.

40. In a data transmission system including a transmitter receiving data to be transmitted on a transmit channel, the transmitter passing the data to a transmission line and limiting a transmission pulse duration of a message signal to $N*T$, where N is an integer number and T is a symbol period of the message signal, and a nonlinear echo compensator, the nonlinear echo compensator comprising:

a plurality of groups of coefficient memories, each of said groups of coefficient memories storing respective coefficients and being assigned to at least one tupel of N successive symbols of a message signal having L levels, N and L being integer numbers;

a selection circuit connected to said plurality of groups of coefficient memories and to be connected to the transmit channel for receiving an outgoing message signal including symbols, said selection circuit using a currently received one of the symbols of the outgoing message signal and N–1 preceding ones of the symbols of the outgoing message signal for selecting one of said groups of coefficient memories assigned to a tupel formed by the currently received one of the symbols and the N–1 preceding ones of the symbols;

a superposition circuit to be connected to a receive channel and connected to said selection circuit for superposing, successively and according to a symbol clock, the respective coefficients of the selected one of said groups of coefficient memories on a message signal arriving on the receive channel;

a linear echo compensator to be connected to the transmit channel, said linear echo compensator being a digital transversal filter, said linear echo compensator and said nonlinear echo compensator providing respective output signals; and a fixed recursive filter connected in series with said linear echo compensator.

41. An echo compensator configuration, comprising:

a nonlinear echo compensator including:
- a plurality of groups of coefficient memories, each of said groups of coefficient memories storing respective coefficients and being assigned to at least one tupel of N successive symbols of a message signal having L levels, N and L being integer numbers;
- a selection circuit connected to said plurality of groups of coefficient memories and to be connected to a transmit channel for receiving an outgoing message signal including symbols, said selection circuit using a currently received one of the symbols of the outgoing message signal and N−1 preceding ones of the symbols of the outgoing message signal for selecting one of said groups of coefficient memories assigned to a tupel formed by the currently received one of the symbols and the N−1 preceding ones of the symbols;
- a superposition circuit to be connected to a receive channel and connected to said selection circuit for superposing, successively and according to a symbol clock, the respective coefficients of the selected one of said groups of coefficient memories on a message signal arriving on the receive channel;
- a linear echo compensator to be connected to the transmit channel, said linear echo compensator being a digital transversal filter, said linear echo compensator and said nonlinear echo compensator providing respective output signals;
- a fixed recursive filter having an input; and
- an addition circuit having an output connected to said input of said fixed recursive filter for adding the respective output signals from said nonlinear echo compensator and from said linear echo compensator.

42. The echo compensator configuration according to claim 41, wherein said superposition circuit is configured as an addition element.

43. The echo compensator configuration according to claim 41, wherein said fixed recursive filter has a transfer function $f=1/(1-(1-2^n)z^{-1})$ where n is an integer number and z is a complex value.

44. In a data transmission system including a transmitter receiving data to be transmitted on a transmit channel, the transmitter passing the data to a transmission line and limiting a transmission pulse duration of a message signal to N*T, where N is an integer number and T is a symbol period of the message signal, and a nonlinear echo compensator, the nonlinear echo compensator comprising:

- a plurality of groups of coefficient memories, each of said groups of coefficient memories storing respective coefficients and being assigned to at least one tupel of N successive symbols of a message signal having L levels, N and L being integer numbers;
- a selection circuit connected to said plurality of groups of coefficient memories and to be connected to the transmit channel for receiving an outgoing message signal including symbols, said selection circuit using a currently received one of the symbols of the outgoing message signal and N−1 preceding ones of the symbols of the outgoing message signal for selecting one of said groups of coefficient memories assigned to a tupel formed by the currently received one of the symbols and the N−1 preceding ones of the symbols;
- a superposition circuit to be connected to a receive channel and connected to said selection circuit for superposing, successively and according to a symbol clock, the respective coefficients of the selected one of said groups of coefficient memories on a message signal arriving on the receive channel;
- a linear echo compensator to be connected to the transmit channel, said linear echo compensator being a digital transversal filter, said linear echo compensator and said nonlinear echo compensator providing respective output signals;
- a fixed recursive filter having an input; and
- an addition circuit having an output connected to said input of said fixed recursive filter for adding the respective output signals from said nonlinear echo compensator and from said linear echo compensator.

* * * * *

UNITED STATES PATENT AND TRADEMARK OFFICE
CERTIFICATE OF CORRECTION

PATENT NO. : 6,563,870 B1  Page 1 of 1
DATED : May 13, 2003
INVENTOR(S) : Heinrich Schenk It is certified that error appears in the above-identified patent and that said Letters Patent is hereby corrected as shown below:

<u>Title page,</u>
Item [30] should read as follows:

-- [30] Foreign Application Priority Data
Dec. 22, 1997 (DE) ……….. 197 57 337 --

Signed and Sealed this

Twenty-sixth Day of August, 2003

JAMES E. ROGAN
*Director of the United States Patent and Trademark Office*